United States Patent [19]

Scott

[11] Patent Number: 5,204,798
[45] Date of Patent: Apr. 20, 1993

[54] METERING ACCESSORY FOR MOLDED CASE CIRCUIT BREAKERS

[75] Inventor: Graham A. Scott, Avon, Conn.

[73] Assignee: General Electric Company, New York, N.Y.

[21] Appl. No.: 733,489

[22] Filed: Jul. 22, 1991

[51] Int. Cl.⁵ .............................................. H02H 3/04
[52] U.S. Cl. ........................................ 361/93; 361/91; 361/357
[58] Field of Search ............... 361/93, 96, 97, 115, 361/357, 395, 91; 364/483; 324/424

[56] References Cited

U.S. PATENT DOCUMENTS

| | | | |
|---|---|---|---|
| 4,589,052 | 5/1986 | Dougherty | 361/94 |
| 4,728,914 | 3/1988 | Morris et al. | 335/6 |
| 4,831,221 | 5/1989 | Yu et al. | 200/553 |
| 4,835,842 | 6/1989 | Castonguay et al. | 29/622 |
| 4,870,531 | 9/1989 | Danek | 361/93 |
| 4,890,184 | 12/1989 | Russell | 361/87 |
| 4,977,513 | 12/1990 | LaPalme | 361/93 |
| 4,991,042 | 2/1991 | Tokarski et al. | 361/93 |

Primary Examiner—A. D. Pellinen
Assistant Examiner—S. Jackson
Attorney, Agent, or Firm—Richard A. Menelly

[57] ABSTRACT

A rating plug-metering accessory for molded case circuit breakers of the type employing an electronic trip unit is in the form of a rating plug enclosure that is optionally installed in the circuit breaker cover. Besides setting the ampere rating of the electronic trip unit, the rating plug-metering accessory further provides direct readout of the current in any of the phases of a multiphase power distribution circuit. The rating plug-metering accessory can be either factory-installed or installed in situ.

10 Claims, 4 Drawing Sheets

METERING ACCESSORY FOR MOLDED CASE CIRCUIT BREAKERS

BACKGROUND OF THE INVENTION

The use of electronic trip units within industrial-rated molded case circuit breakers allows a single circuit breaker design to be used over a wide range of circuit breaker ratings by means of a field-installable rating plug. An electronic trip unit is described in U.S. Pat. No. 4,589,052 and a rating plug is disclosed within U.S. Pat. No. 4,728,914.

U.S. Pat. No. 4,991,042 describes an electronic circuit breaker that includes a keypad and display on the circuit breaker cover for displaying stored trip parameters along with displaying the power systems voltage and current.

It would be economically advantageous to provide existing circuit breakers with metering facility without requiring the addition of a keypad and display.

Accordingly, one purpose of the invention is to describe a metering accessory that can be added to existing circuit interrupters employing an electronic trip unit without modification to the trip unit circuit.

SUMMARY OF THE INVENTION

A rating plug-metering accessory sets the circuit breaker trip unit ampere rating and allows the power system circuit current to be displayed, in real time.

BRIEF DESCRIPTION OF THE DRAWINGS

A circuit breaker employing an electronic trip unit, metering-rating plug accessory and other field-installable accessories is depicted in FIG. 1.

DESCRIPTION OF THE PREFERRED EMBODIMENT

Figure 1:
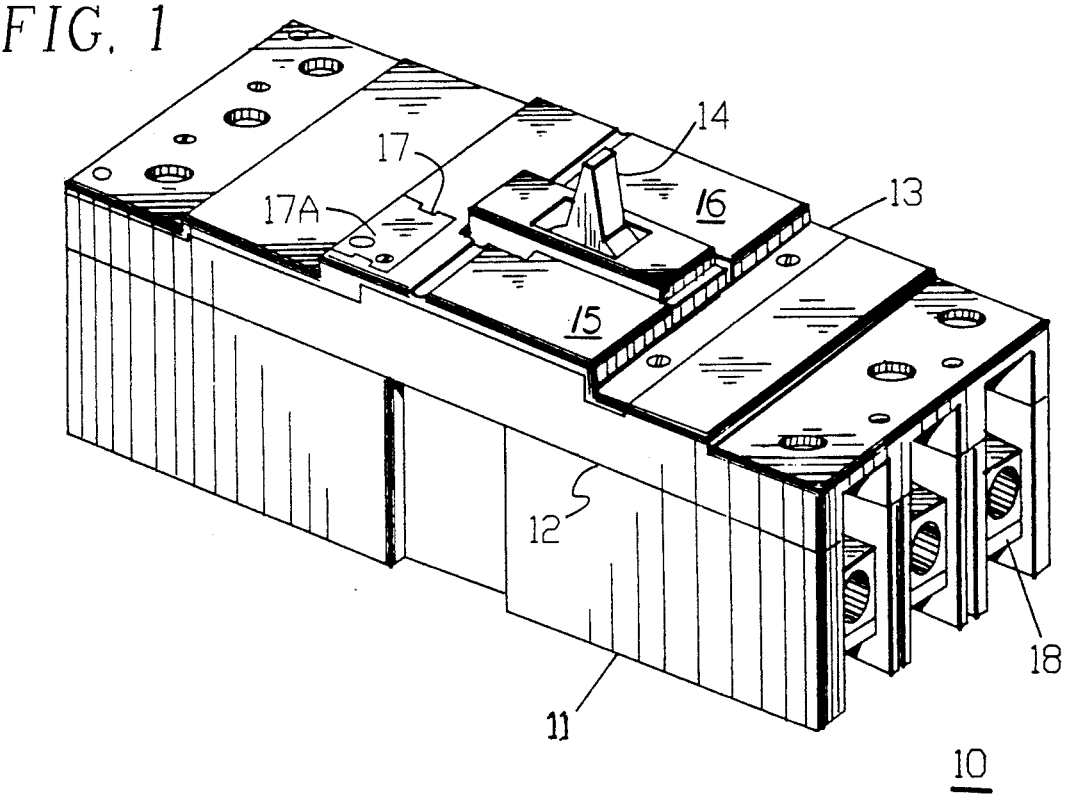

An industrial-rated molded case circuit breaker 10 shown in FIG. 1 includes the mechanical operating components within the circuit breaker case 11 and the electronic components within the circuit breaker cover 12. An accessory cover 13 attached to the circuit breaker cover protects the electronic components from the environment. An operating handle 14 extends through the circuit breaker cover and allows the circuit breaker contacts to be moved to their open and closed positions. Access to a selected circuit breaker accessory is made by means of the accessory door 15 while access to the circuit breaker actuator-accessory is obtained through the accessory door 16. One example of a field-installable accessory is found within U.S. Pat. No. 4,831,221 and a good description of the actuator-accessory unit is found within U.S. Pat. No. 4,890,184. The rating plug-metering accessory 17 electrically connects with the circuit breaker electronic trip unit contained within the circuit breaker cover and is field-installable along with the accessory and actuator-accessory units. Electrical connection of the circuit breaker within an electrical power distribution system is made by means of the line lugs 18 situated at the line end of the circuit breaker. Connection with a protected electrical load is made by means of the load lugs (not shown) situated at the opposite load end of the circuit breaker. Visual access to the rating plug-metering accessory components is made by means of the transparent cover 17A.

Figure 2:
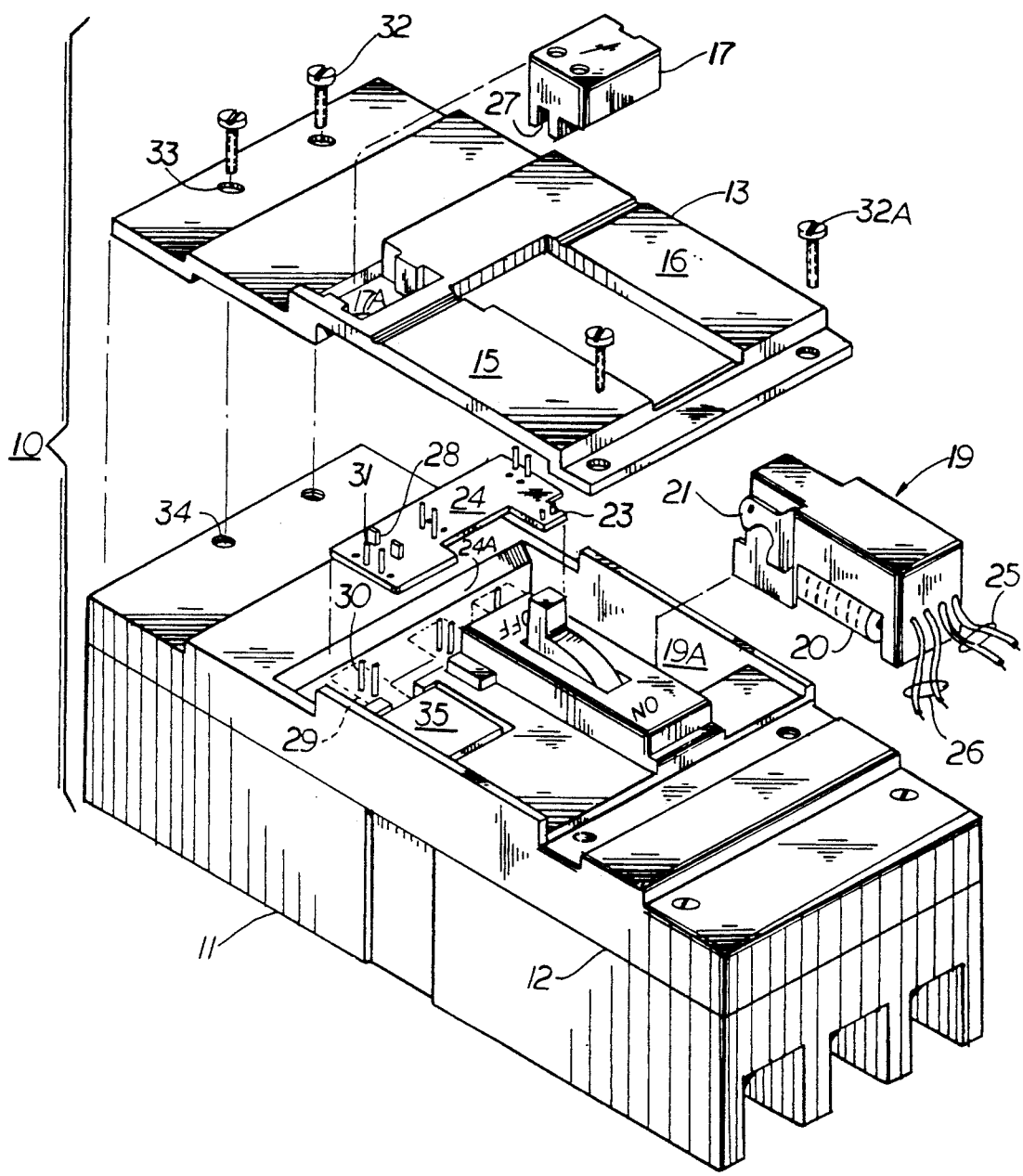
FIG. 2 is a top perspective view of the circuit breaker of FIG. 1 prior to assembly of the components within the circuit breaker cover.

The assembly of the electronic components within the circuit breaker cover 12 is best seen by referring now to the circuit breaker 10 depicted in FIG. 2. With the mechanical components, such as the operating mechanism described in U.S. Pat. No. 4,835,842, contained within the circuit breaker case 11 and with the circuit breaker cover 12 securely fastened to the case, the electronic components are assembled within the circuit breaker cover in the following manner. The current transformers 29 electrically connect with the trip unit printed wire board 24 by means of the transformer pins 30 and the trip unit pin connectors 31 when the trip unit printed circuit board is inserted within the trip unit recess 24A. The actuator-accessory unit 19 which is described in the aforementioned U.S. Pat. No. 4,890,184, includes an electro-magnetic coil 20 for controlling the trip latch 21 which interacts with the circuit breaker operating mechanism to controllably interrupt the circuit current. The actuator-accessory unit electrically connects with the trip unit printed wire board by means of the pins 23 on the trip unit and the sockets (not shown) on the actuator-accessory unit. External electrical connection with the trip unit-accessory unit is made by means of conductors 25, 26. The trip unit-accessory unit 19 is inserted within the actuator-accessory unit 19A formed within the circuit breaker cover opposite the auxiliary switch accessory unit 35. The auxiliary switch accessory is described, for example, in the U.S. Pat. No. 4,831,221. The accessory cover 13 is removably attached to the circuit breaker cover 12 by means of screws 32, thru-holes 33 and threaded openings 34. To remove, or install the accessory and actuator-accessory units, the screws 32A are removed and the accessory doors 15, 16 are rotated in the counterclockwise direction to their open position. The rating plug-metering accessory unit 17 is inserted within the corresponding recess formed within the accessory door 13 and electrically connects with the trip unit by means of the pins 28 upstanding from the trip unit printed wire board 24 and the sockets 27 formed on the bottom of the rating plug-metering accessory.

Figure 3:
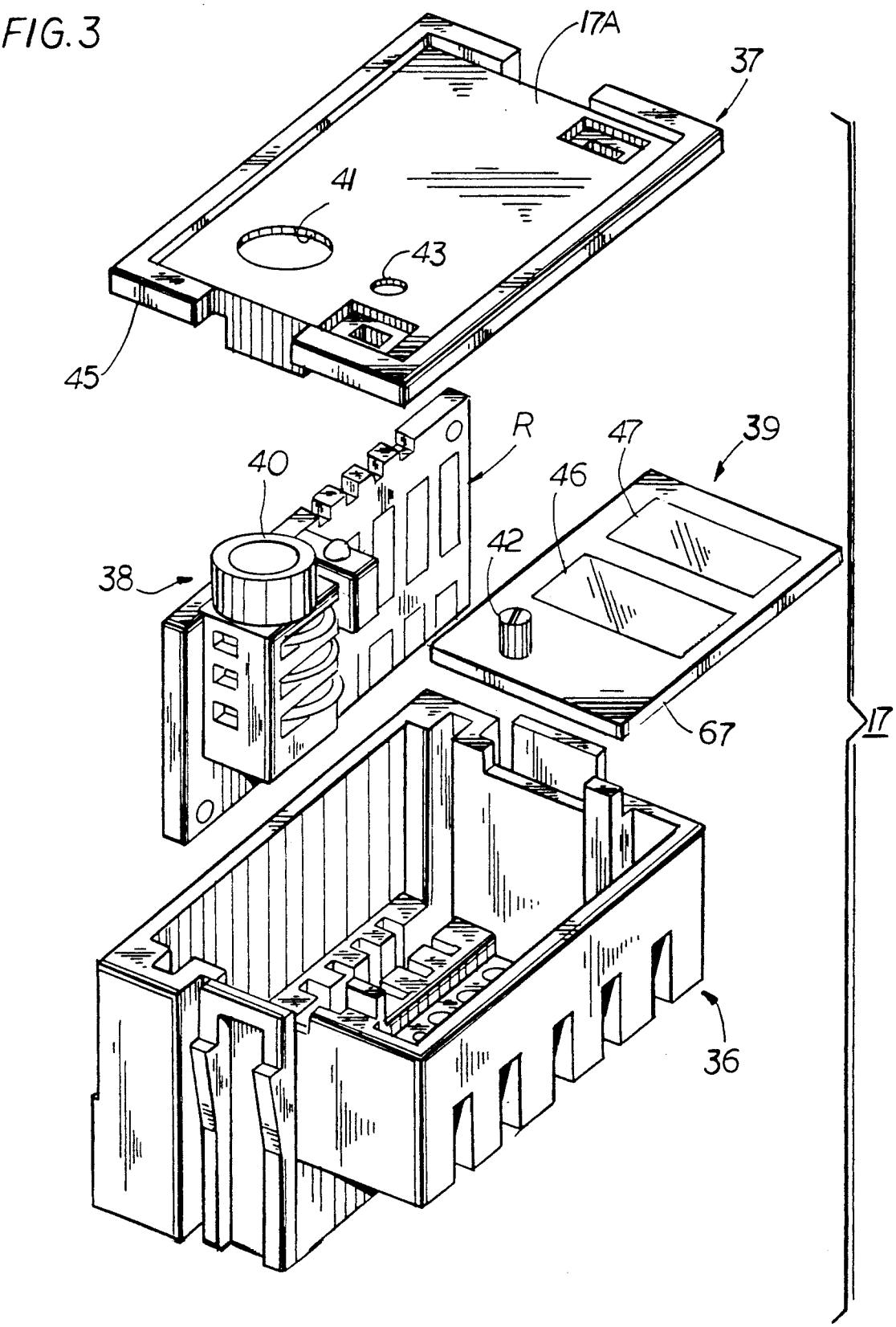
FIG. 3 is a top perspective view in isometric projection of the rating plug-metering accessory of FIG. 2 prior to assembly.

The rating plug-metering accessory 17 is depicted in FIG. 3 prior to insertion of the rating resistor printed wire board 38 and metering printed wire board 39 within the case 36. As described within U.S. Pat. No. 4,728,914, the rating resistor printed wire board contains the circuit breaker rating resistor R and the rating plug calibration potentiometer 40. In accordance with the invention, the metering printed wire board 39 contains the metering substrate printed wire board 67, alphanumeric display elements 46, 47 and the potentiometer switch 42. The cover 37 is attached to the case 36 and consists of a transparent plastic plate 17A surrounded by a plastic perimetric frame 45 for additional support. The alphanumeric displays 46, 47 are visually accessed through the transparent cover while the rating plug calibration potentiometer 40 is accessed by means of the larger opening 41 and the potentiometer switch 42 is accessed by means of the smaller opening 43.

Figure 4:
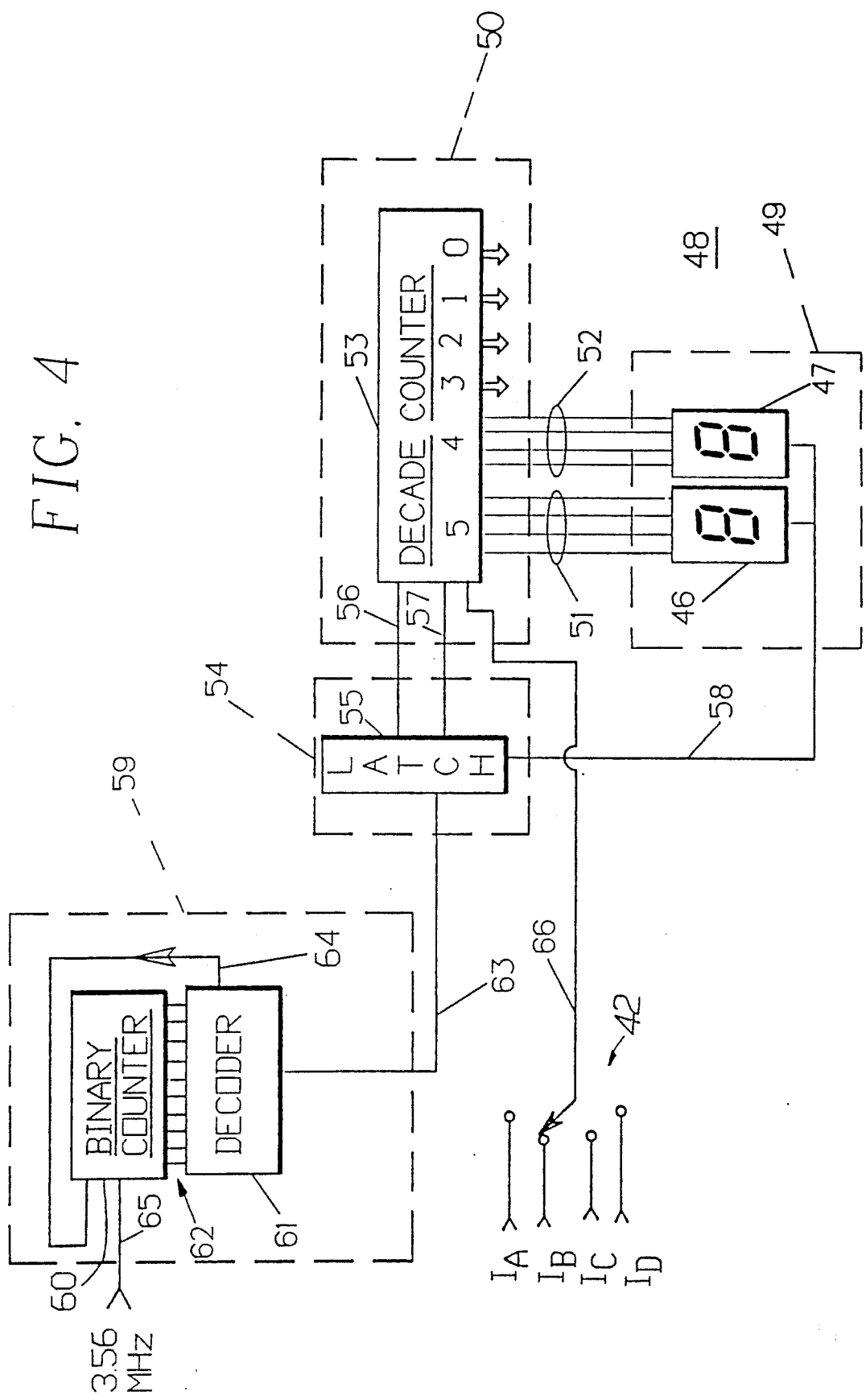
FIG. 4 is a schematic representation of the electric circuit contained within the rating plug-metering accessory shown in FIG. 3.

The metering circuit 48 depicted in FIG. 4 comprises the display circuit 49, decoder circuit 50, control circuit 54 and the timer circuit 59. The alphanumeric display elements 46, 47 within the display circuit electrically connect with pins 4, 5 of the decade counter 53 over cable conductors 51, 52. The decade counter connects with the latch 55 by means of conductors 56, 57 and the latch connects with the alphanumeric display units 46, 47 over a common Conductor 58. The latch connects with the decoder 61 by means of conductor 63. The decoder is fed by a 22 stage binary counter 60 over a 10 lead data bus 62 and the decoder connects with the input to the binary counter by means of a feedback-loop conductor 64. A 3.56 megahertz clock pulse is inputted to the binary counter over conductor 65 from the timer contained within the electronic trip unit 24 (FIG. 2). The multi-phase input current $I_A$-$I_D$ from the electronic trip unit is inputted to the decade counter 53 by means of conductor 66 and the four position rotary switch 42 shown earlier in FIG. 3. The rotary switch allows the circuit current values in any of the four phases of an industrial power distribution circuit to be displayed at any one time. The operating power for the alphanumeric display units is obtained from the power supply contained within the electronic trip unit.

Optional accessory means for providing metering function to an industrial-rated circuit breaker by means of a combined rating plug-metering accessory has herein been described. The rating plug-metering accessory can be installed at the point of manufacture or at the site of installation, if so desired.

Having thus described my invention, what I claim as new and desire to secure by Letters Patent is:

1. A metering accessory comprising in combination:
    a plastic case and a transparent cover:
    an alphanumeric display within said case subjacent said cover displaying circuit current data;
    a metering circuit within said case and arranged for connection with an electronic trip unit and with a plurality of current transformers providing said circuit current data to said display; and
    a rating resistor within said case arranged for connection with said trip unit to set the ampere rating of said trip unit.

2. The metering accessory of claim 1 wherein said metering circuit includes a decade counter interconnected with a latch and with said alphanumeric display.

3. The metering accessory of claim 2 wherein said metering circuit further includes a decoder and interconnected with a binary counter and with said latch.

4. The metering accessory of claim 3 wherein said binary counter is arranged for connection with said electronic trip unit for receiving a predetermined clock pulse.

5. The metering accessory of claim 2 further including a rotary switch interconnecting said decade counter with said plurality of phase current transformers.

6. A molded case circuit breaker comprising:
    a plastic case and cover;
    a pair of separable contacts within said case arranged for automatic separation upon occurrence of an overcurrent condition of predetermined magnitude through a plurality of current transformers;
    a metering accessory within said cover arranged for providing real time visual indication of circuit current data within an associated electric circuit, said metering accessory comprising a transparent cover attached to a plastic base;
    a metering circuit connected with said trip unit and said current transformers to provide said current data to said metering accessory; and
    an electronic trip unit within said circuit breaker case controlling said automatic separation of said contacts, said trip unit being connected with said metering accessory providing operating power to said metering accessory.

7. The circuit breaker of claim 6 wherein said circuit breaker cover contains a recess for receiving said metering accessory case and cover.

8. The circuit breaker of claim 6 wherein said metering accessory includes an alphanumeric display arranged under said transparent cover.

9. The circuit breaker of claim 6 further including an electronic trip unit within said circuit breaker case controlling said automatic separation of said contacts, said trip unit being connected with said metering accessory providing operating power to said metering accessory.

10. The circuit breaker of claim 6 including a rating resistor within said metering accessory to set the ampere rating of said circuit breaker.

* * * * *